United States Patent
McMickell et al.

(10) Patent No.: US 8,002,233 B2
(45) Date of Patent: Aug. 23, 2011

(54) DISTRIBUTED NETWORK VIBRATION ISOLATION SYSTEM AND VIBRATION ISOLATORS USEFUL THEREIN

(75) Inventors: Brett M. McMickell, Scottsdale, AZ (US); Haowei Bai, Glendale, AZ (US); Thomas R. Kreider, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 956 days.

(21) Appl. No.: 11/860,339

(22) Filed: Sep. 24, 2007

(65) Prior Publication Data

US 2009/0078847 A1 Mar. 26, 2009

(51) Int. Cl.
*F16M 11/00* (2006.01)
*F16M 13/00* (2006.01)

(52) U.S. Cl. ............ 248/638; 248/550; 267/136
(58) Field of Classification Search .......... 248/636, 248/638, 550, 559; 267/140.14, 140.15, 267/136; 310/322, 328
See application file for complete search history.

(56) References Cited

U.S. PATENT DOCUMENTS

| | | | |
|---|---|---|---|
| 3,606,233 A * | 9/1971 | Scharton et al. | 248/550 |
| 5,332,070 A | 7/1994 | Davis et al. | |
| 5,899,443 A | 5/1999 | Su | |
| 6,003,849 A | 12/1999 | Davis et al. | |
| 6,354,576 B1 * | 3/2002 | Jacobs et al. | 267/140.14 |
| 7,586,236 B2 * | 9/2009 | Corsaro et al. | 310/322 |
| 2003/0155194 A1 * | 8/2003 | Kienholz | 188/267 |
| 2005/0217954 A1 | 10/2005 | Hindle et al. | |
| 2006/0006986 A1 * | 1/2006 | Gravelle et al. | 340/10.3 |
| 2009/0020381 A1 * | 1/2009 | Hindle et al. | 267/140.14 |
| 2009/0062931 A1 * | 3/2009 | Keyes et al. | 700/7 |
| 2011/0062306 A1 * | 3/2011 | Heiland | 248/636 |

* cited by examiner

*Primary Examiner* — Tan Le

(74) *Attorney, Agent, or Firm* — Ingrassia Fisher & Lorenz, P.C.

(57) ABSTRACT

A distributed network vibration isolation system includes several vibration isolation nodes distributed throughout a structure. The nodes wirelessly intercommunicate and include a passive structural isolation device and an active structural isolation device. The nodes work together via wireless communication to isolate a payload from a disturbance source.

6 Claims, 7 Drawing Sheets

DISTRIBUTED NETWORK VIBRATION ISOLATION SYSTEM AND VIBRATION ISOLATORS USEFUL THEREIN

TECHNICAL FIELD

The present invention generally relates to vibration isolation systems and vibration isolators used in such systems and, more particularly, to a distributed network vibration isolation system and vibration isolators used in the distributed network.

BACKGROUND

Precision structural systems carrying a load, such as a telescope system, may be susceptible to disturbances that produce structural vibrations. These structural vibrations may concomitantly produce pointing errors in the telescope system. The disturbances may be attributed to components or assemblies of a structural system itself, and are typically distributed throughout the precision structure. Thus, the structural vibrations produced by these disturbance sources may also be distributed throughout the precision structure. Because these structural systems typically have little inherent damping, vibration isolation systems may be used to damp these disturbance-induced vibrations in the precision structure and isolate the payload carried by the precision structure.

Vibration isolation systems typically include a plurality of vibration isolators between the precision structure and the payload. The plurality of vibration isolators that comprise the vibration isolation system may include passive vibration isolators, active vibration isolators, or hybrid vibration isolators. In many instances, the vibration isolation system employs a plurality of hybrid vibration isolators. Hybrid vibration isolators include both passive and active vibration isolators, and thus exhibit the desirable characteristics of both passive and active vibration isolators. Namely, the good vibration isolation at relatively high frequencies that passive vibration isolators exhibit, and the good vibration isolation at relatively low frequencies, and active tuning, that active vibration isolators exhibit.

Vibration isolation systems also typically include a central control that is electrically coupled to each of the hybrid vibration isolators via interconnecting cables. The central control receives data from each hybrid isolator, processes the data, and supplies appropriate commands to each hybrid vibration isolator to damp the vibrations at each isolator's location. The central control is typically disposed in a central electronics control box. As may be appreciated, this central electronic control box represents a relatively large single point mass in the system, which can increase vibration isolation system design complexity. Moreover, modifications to the precision structure may be needed to accommodate the interconnecting cables and associated cable harnesses. Furthermore, both the central control and the interconnecting cables increase overall system weight, which can adversely impact overall system construction and operational costs.

Hence, there is a need for a vibration isolation system that provides heterogeneous disturbance suppression while reducing overall system complexity by eliminating large single point masses, and/or by eliminating cable harnesses, and/or reducing structural modifications to the structure itself. The present invention addresses one or more of these needs.

BRIEF SUMMARY

In one embodiment, and by way of example only, an integral hybrid isolator for damping vibrations of a mass includes a housing, a passive vibration isolator, and an active vibration isolator. The passive vibration isolator is disposed within the housing and is adapted to couple to, and to passively damp structural vibrations in, the mass. The active vibration isolator is disposed within the housing and is adapted to couple to, and to actively damp structural vibrations in, the mass. The active vibration isolator includes an actuator, a sensor, and a controller. The actuator is coupled to receive actuation control signals and is operable, in response to the actuation control signals, to move. The sensor is configured to sense one or more parameters representative of structural vibrations in the mass and to supply sensor signals representative thereof. The controller is coupled to receive the sensor signals and is operable, in response to the sensor signals, to supply the actuation control signals to the actuator.

In another exemplary embodiment, an integral hybrid isolator for damping vibrations of a mass includes a housing, a passive vibration isolator, an active vibration isolator, and a transceiver. The passive vibration isolator is disposed within the housing and is adapted to couple to, and to passively damp structural vibrations in, in the mass. The active vibration isolator is disposed within the housing and is adapted to couple to, and actively damp structural vibrations in, the mass. The active vibration isolator includes an actuator, a sensor and a controller. The actuator is coupled to receive actuation control signals and is operable, in response to the actuation control signals, to move. The sensor is configured to sense one or more parameters representative of structural vibrations in the mass and to supply sensor signals representative thereof. The controller is coupled to receive the sensor signals and is operable, in response to the sensor signals, to supply the actuation control signals to the actuator. The transceiver is in operable communication with at least the actuator controller. The transceiver is operable to transmit local isolator data representative of at least one or more operational states of the integral hybrid isolator, and to receive remote isolator data representative of at least one or more operational states of one or more other integral hybrid isolators.

In another exemplary embodiment, a distributed vibration isolation system for damping vibrations in a mass includes a supervisor and a plurality of hybrid vibration isolators. The supervisor includes a global model representative of the distributed vibration isolation system and is configured to wirelessly receive isolator data transmitted from a plurality of hybrid vibration isolators, compare the received isolator data to the global plant model, and wirelessly transmit isolator commands to one or more of the plurality of hybrid vibration isolators. Each hybrid vibration isolator is adapted to be coupled to the mass at a connection point, and is at least partially responsive to local commands to damp vibrations in the mass. Each hybrid vibration isolator includes an isolator controller and a wireless transceiver. The isolator controller is configured to implement a control algorithm. The isolator controller is coupled to receive data representative of the isolator commands and, in response thereto, to update the control algorithm. The isolator controller is further adapted to receive data representative of the mass at the connection point and, in response thereto, to generate the local commands. The wireless transceiver is in operable communication with the supervisor and the isolator controller. The wireless transceiver is configured to at least selectively receive the isolator commands transmitted thereto from the supervisor, supply the data representative of the isolator commands to the isolator controller, and at least selectively transmit isolator data to the supervisor. The isolator data are data representative of at least a state of the hybrid vibration isolator.

In yet another exemplary embodiment a distributed vibration isolation system for damping vibrations in a mass includes a plurality of hybrid vibration isolators. Each hybrid vibration isolator is adapted to be coupled to the mass at a connection point, and is at least partially responsive to local commands to damp vibrations in the mass. Each hybrid vibration isolator is in operable communication with at least one other of the plurality of hybrid vibration isolators. Each hybrid vibration isolator includes an isolator controller and a wireless transceiver. The isolator controller is configured to implement a control algorithm, and includes a global model representative of the distributed vibration isolation system. The isolator controller is coupled to receive data representative of isolator data and is operable, in response thereto, to update the control algorithm. The isolator controller is further adapted to receive data representative of the mass at the connection point and, in response thereto, to generate the local commands. The wireless transceiver is in operable communication with the isolator controller, and is configured to at least selectively receive the isolator data transmitted thereto from the at least one other of the plurality of hybrid vibration isolators, supply the data representative of the isolator data to the isolator controller, and at least selectively transmit isolator data to the at least one other of the plurality of hybrid vibration isolators. The isolator data are data representative of at least a state of the hybrid vibration isolator.

Other desirable features and characteristics of the vibration isolation systems will become apparent from the subsequent detailed description and the appended claims, taken in conjunction with the accompanying drawings and background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
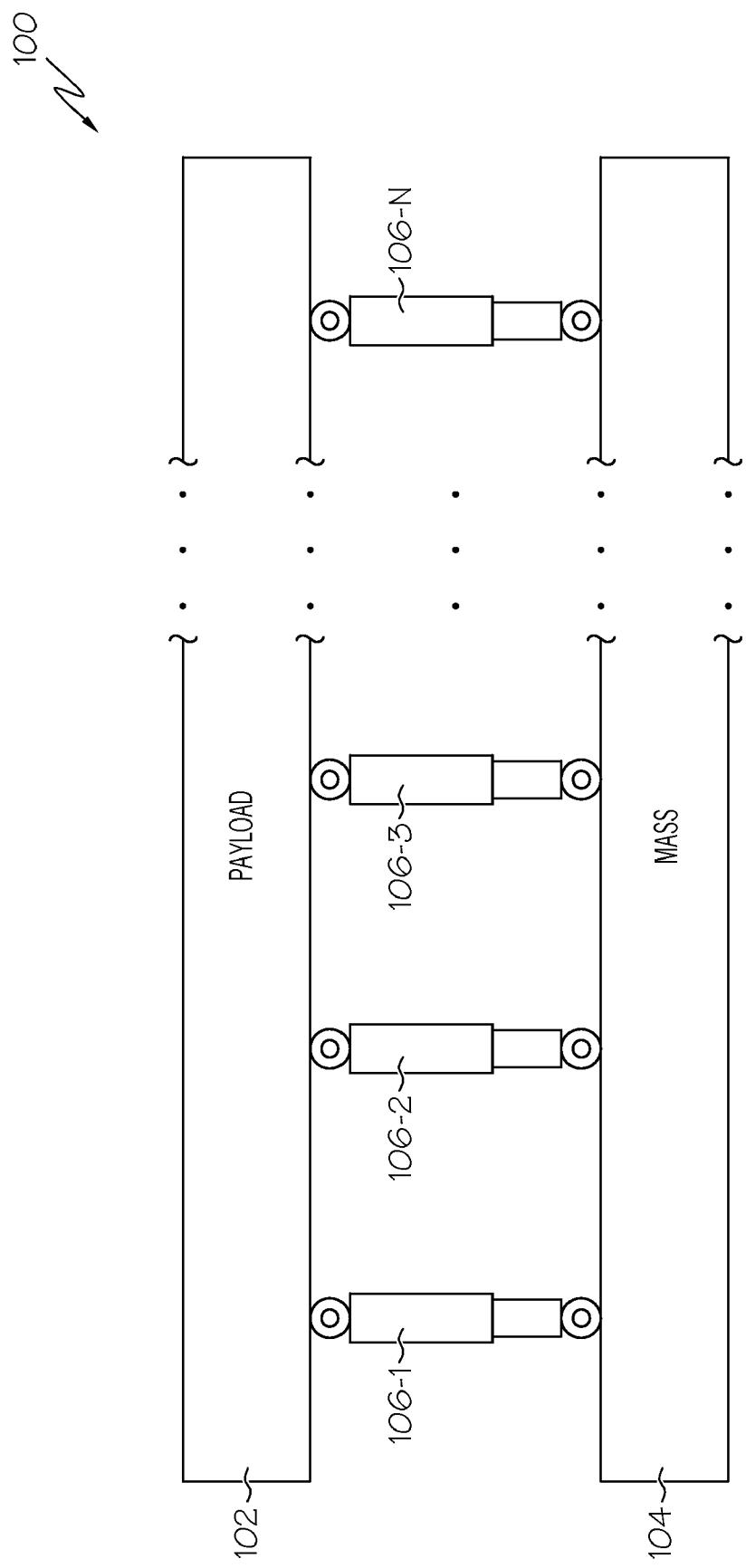
FIG. 1 is a schematic representation of an exemplary vibration isolation system.

A schematic representation of a vibration isolation system 100 is depicted in FIG. 1. The system 100 includes a payload 102, a mass 104, and a plurality of vibration isolators 106 (e.g., 106-1, 106-2, 106-3, ... 106-N). The payload 102 may be a precision pointing system or any one of numerous other devices susceptible to induced structural vibrations. The mass 104 may be any one of numerous vehicles such as, for example, a spacecraft, underwater craft, or land craft. The vibration isolators 106 are each configured to operate together to isolate structural vibrations that may be induced into the payload 102. Each vibration isolator 106 is coupled between the payload 102 and mass 104 at a connection point. It will be appreciated that two or more vibration isolators 106 may be employed, and the location of each of the connection points may vary.

Figure 2:
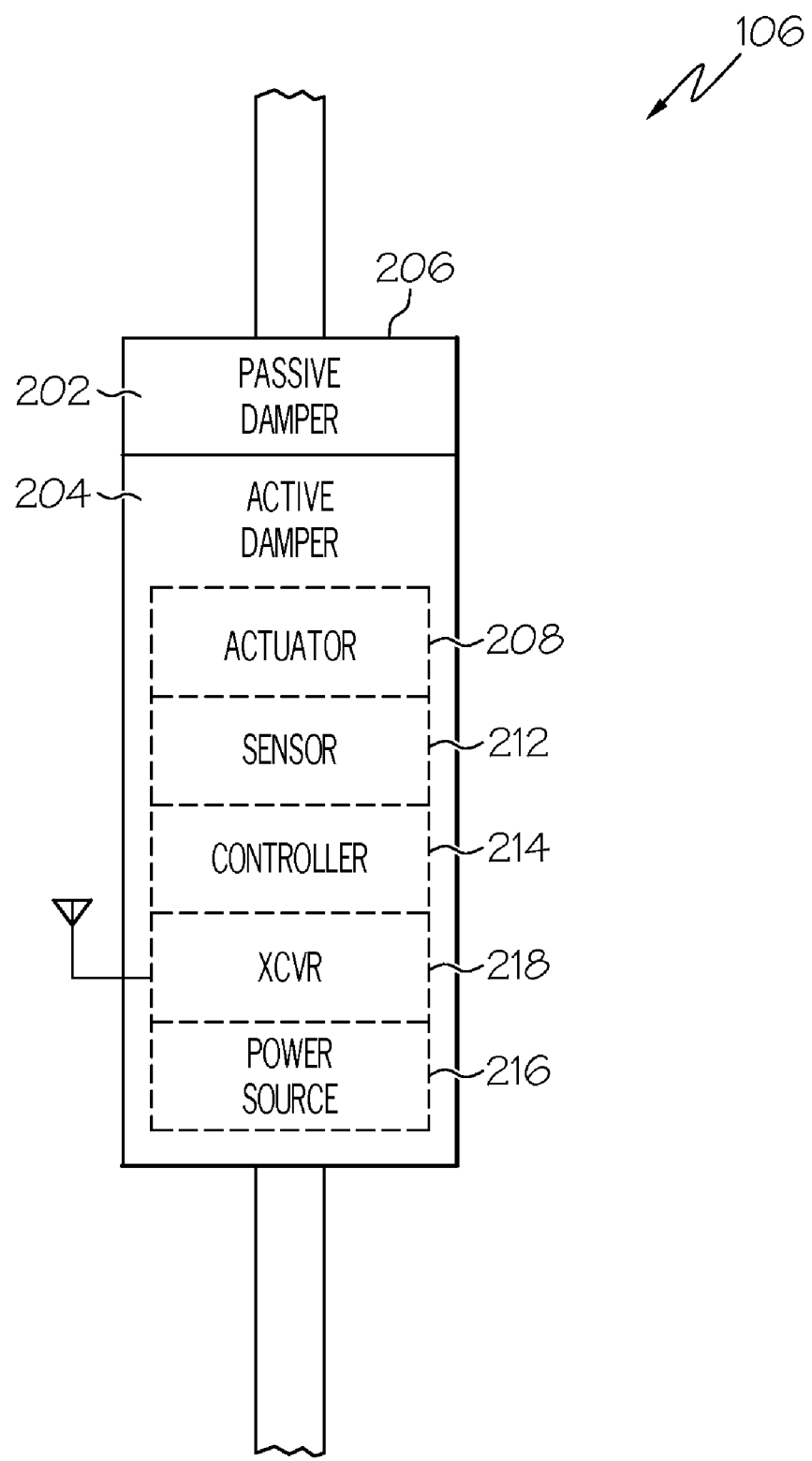
FIG. 2 is functional block diagram of an exemplary embodiment of a hybrid vibration isolator that may be used to implement the system of FIG. 1.

Preferably, each vibration isolator 106 is implemented as a hybrid vibration isolator. A simplified functional block diagram of an exemplary embodiment of one of the hybrid vibration isolators in depicted in FIG. 2. With reference to FIG. 2, it is seen that the hybrid vibration isolator 106 includes a passive damper (or isolator) 202 and an active damper (or isolator) 204, both disposed in the same housing assembly 206. The passive damper 202 is configured to passively damp structural vibrations in the mass 104, and may be implemented using any one of numerous known passive damper configurations. Some non-limiting examples of suitable passive dampers include the passive dampers disclosed in any one or more of U.S. Pat. No. 4,760,996, entitled "Damper and Isolation," U.S. Pat. No. 5,332,070, entitled "Three Parameter Viscous Damper and Isolator," and U.S. Pat. No. 5,219,051, entitled "Folded Viscous Damper," all of which are assigned to the assignee of the present invention The active damper 204 is configured to actively damp structural vibrations in the mass 104 and includes an actuator 208, a sensor 212, and a controller 214. The actuator 208 is responsive to actuation control signals to move, and thereby damp the structural vibrations. The actuator 208 may be implemented using any one of numerous known suitable actuators 208 including, for example, a piezoelectric actuator, a voice coil actuator, or servo motor actuator. The sensor 212 is configured to sense one or more parameters representative of structural vibrations in the mass 104, and supplies sensor signals representative of the sensed parameters to the controller 214. The sensor 212 may also be implemented using any one of numerous known suitable sensors including, for example, any one of numerous types of force sensors, any one of numerous types of acceleration sensors, or both. No matter the particular type and configuration of the sensor 212, the sensor signals, as was just noted, are supplied to the controller 214.

The controller 214 implements a control algorithm that is responsive to the sensors signals supplied from the sensor 212 to supply the actuation control signals to the actuator 208. As will be described in more detail further below, the controller 214, in at least some embodiments, is further responsive to various other data and/or commands supplied to the hybrid vibration isolator 106, to update the control algorithm. The control algorithm, as may be appreciated, may be implemented using a suitable control law in combination with a local observer (or state estimator).

As FIG. 2 also depicts, each hybrid vibration isolator 106 also preferably includes a power source 216 and a transceiver 218. The power source 216 is the source of electrical power for one or more of the actuator 208, the sensor 212, the controller 214, and the transceiver 218. The power source 216 may be any one of numerous suitable stand-alone power sources. Some non-limiting examples include one or more batteries, one or more solar power devices, or one or more combinations of such devices. The transceiver 218 is configured to wirelessly receive data that are wirelessly transmitted to the hybrid vibration isolator 106, and to wirelessly transmit data from the hybrid vibration isolator 106. It will be appreciated that the transceiver 218 may be configured to implement any one of numerous types of RF modulation/demodulation schemes and/or any one of numerous multiple access schemes including, for example, QPSK (Quarternary Phase Shift Key), BFSK (Binary Phase Shift Key), fixed-frequency modulation, Time Division Multiple Access (TDMA), Frequency Division Multiple Access (FDMA), Direct Sequence Spread Spectrum (DSSS), and Frequency Hopping Spread Spectrum (FHSS), just to name a few. As will be described in more detail further below, the transceiver 218 may wirelessly receive data from, and wirelessly transmit data to, either a centralized device or one or more other isolators 106.

Figure 3:
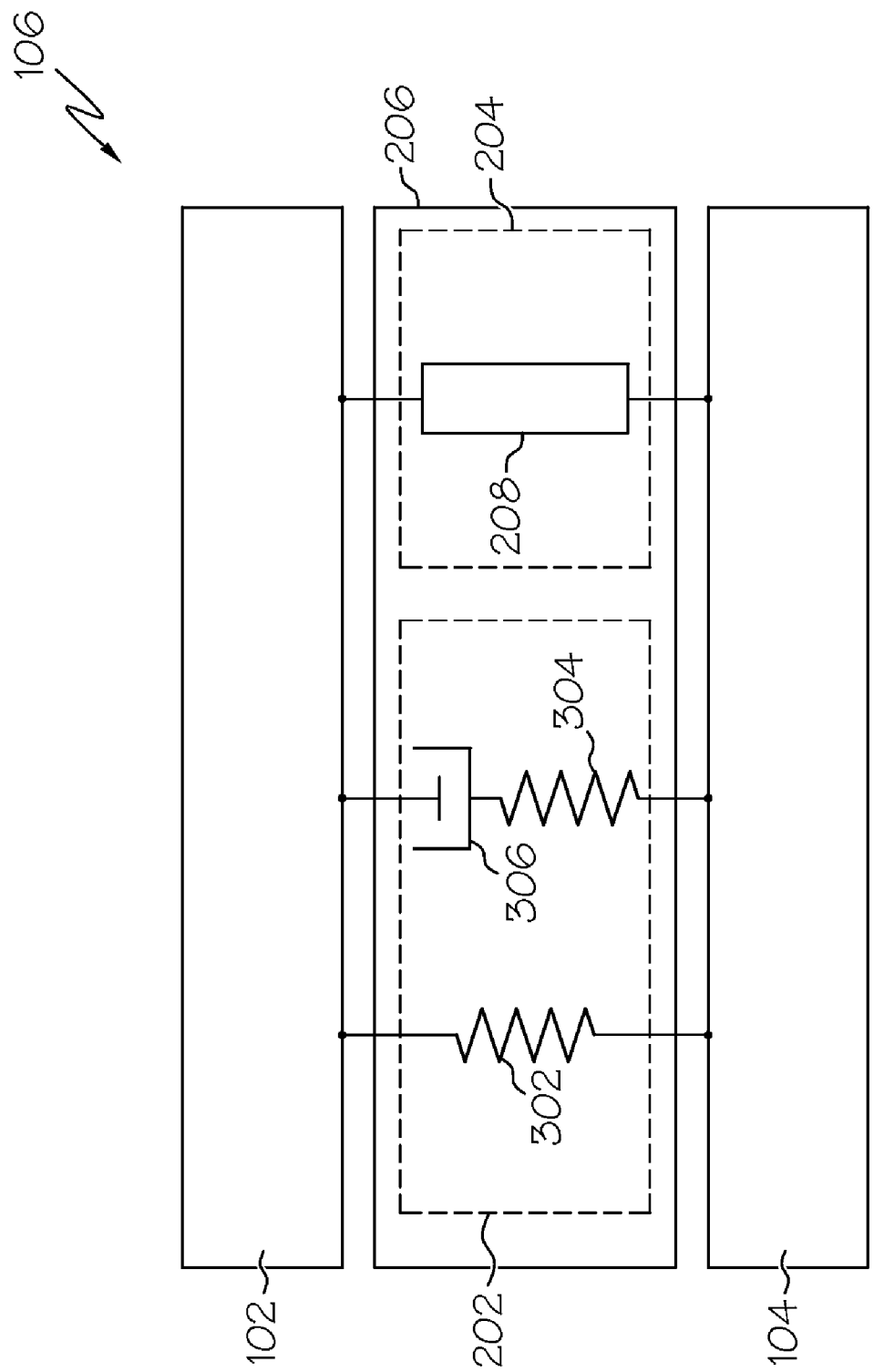
FIG. 3 depicts an exemplary simplified schematic representation of the hybrid vibration isolator of FIG. 2.

Before proceeding further, it is noted that no matter the specific physical configuration of the passive damper 202 and the active damper 204, the hybrid vibration isolator 106 may be schematically depicted as in FIG. 3. The passive damper 202 is schematically depicted as a first spring 302 disposed in parallel with the series combination of a second spring 304 and a damper 306 (or dashpot), and coupled between the payload 102 and mass 104. The active damper 204 is schematically depicted as the actuator 208 disposed in parallel with the passive damper 202, and also coupled between the payload 102 and the mass 104.

Figure 4:
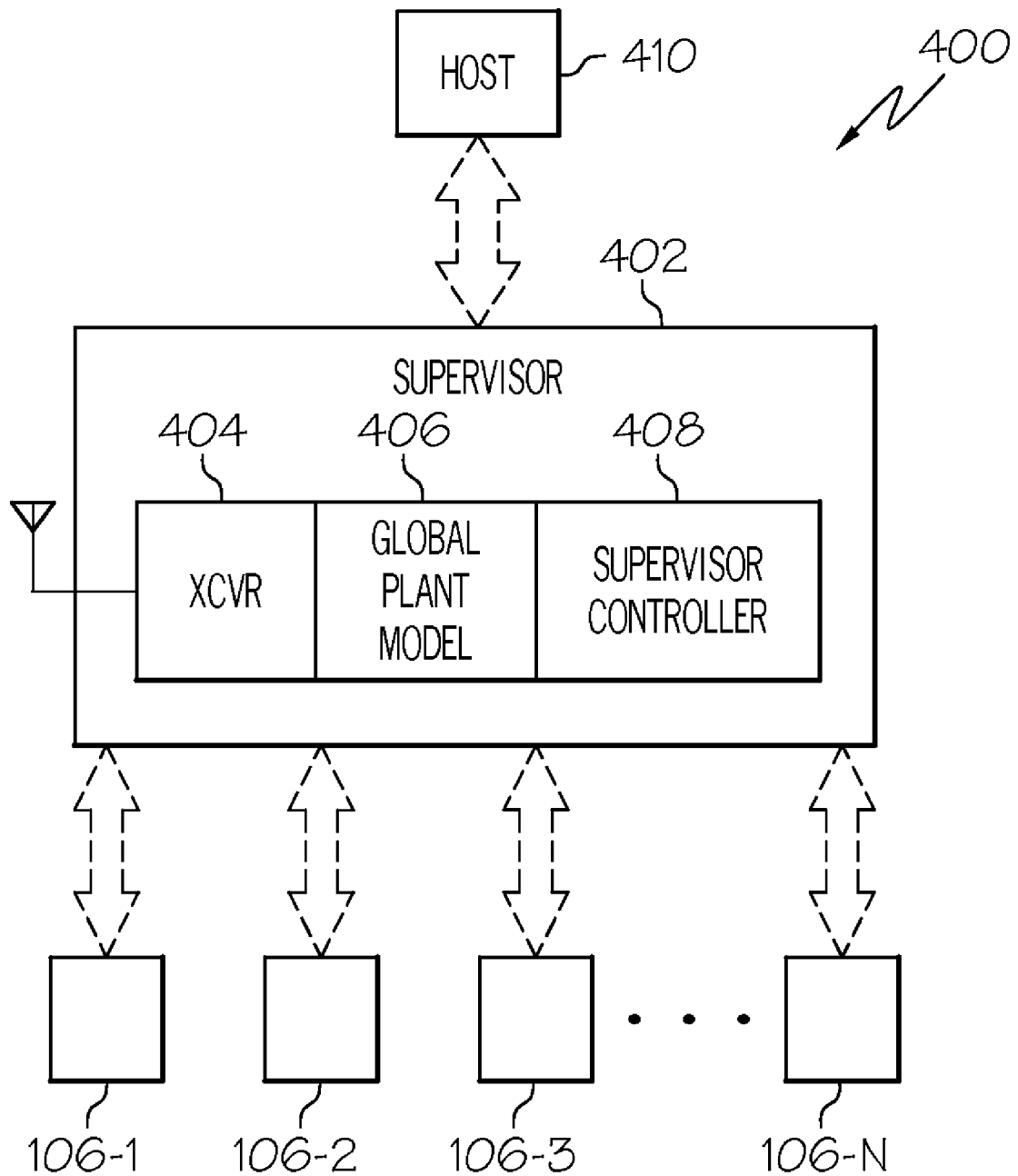
FIG. 4 depicts a functional block diagram of an embodiment of a distributed network vibration isolation system.

Returning once again to the description, it was noted above that the transceiver 218 in each hybrid vibration isolator 106 may wirelessly receive data from, and transmit data to, either a centralized device or to one or more other isolators 106. Turning now to FIG. 4, a functional block diagram of a distributed network vibration isolation system 400, in which each hybrid vibration isolator 106 is configured to wirelessly communicate with a centralized device is depicted. The centralized device, which is referred to herein as a supervisor 402, is in operable communication with each of the isolators 106. More specifically, the supervisor 402 is configured to wirelessly receive isolator data transmitted from each of the vibration isolators 106, and to wirelessly transmit isolator commands to the plurality of vibration isolators 106. The supervisor 402, via the isolator data it receives from each of the vibration isolators 106, monitors for changes in the dynamics of the system 400. The supervisor 402, via the isolator commands it transmits to each of the vibration isolators 106, adapts the controllers 214 in each isolator to achieve optimal performance, both locally and system-wide.

To implement the above-described functionality, and as FIG. 4 further depicts, the supervisor 402 includes a transceiver 404, a global plant model 406, and a supervisor controller 408. The transceiver 404 is configured to wirelessly communicate with each of the vibration isolators 106, and may also be configured to wirelessly communicate with one or more host devices 410. Alternatively, the supervisor 402 may be in operable communication with the host device 410 via a wired communication bus. No matter the particular communication medium that is employed, the host device 410 may be configured to supply global system commands to the system 400, such as system shut down commands, system start-up commands, or the like.

Figure 5:
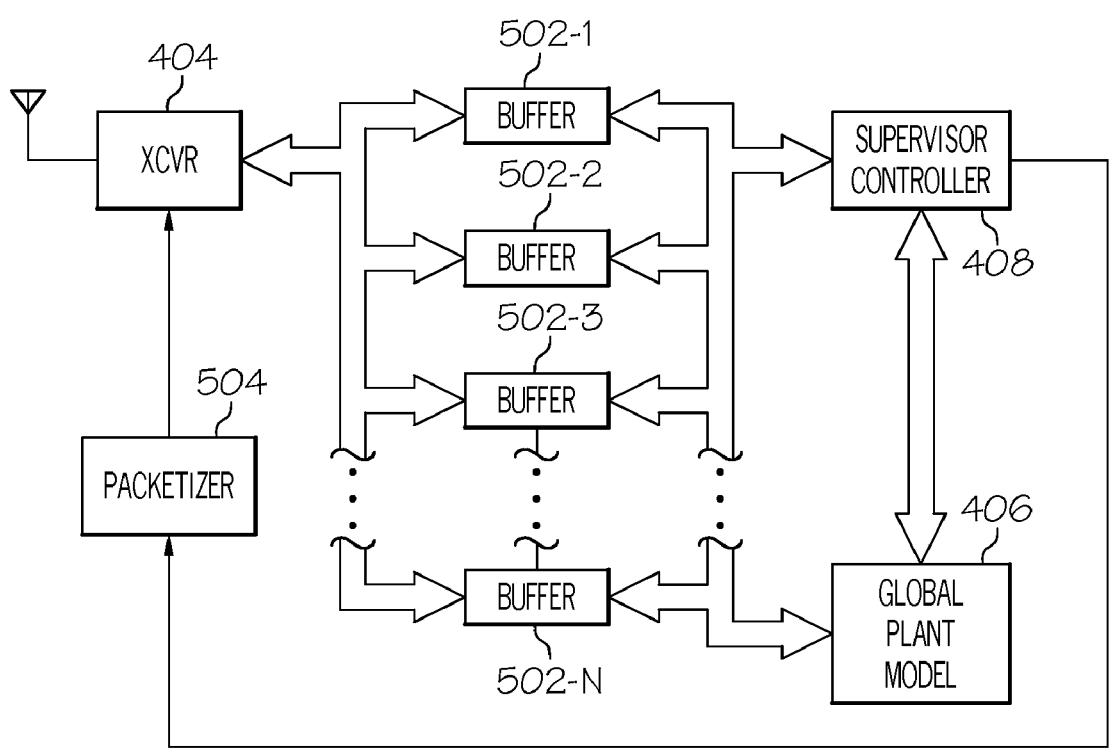
FIG. 5 is a more detailed functional block diagram of an embodiment of a supervisor that may be used to implement the system of FIG. 4.

The global plant model 406 is an adaptive software model of the distributed vibration isolation system 400, and may also be referred to as an adaptive estimator or adaptive observer. The global plant model 406 is coupled to receive the isolator data transmitted to the transceiver 404 from each of the isolators 106. In the depicted embodiment, and as shown more clearly in FIG. 5, a plurality of buffers 502 (e.g., 502-1, 502-2, 502-3, . . . 502-N), one associated with each hybrid vibration isolator 106, is disposed between the transceiver and the global plant model 406. The global plant model 406, preferably under the supervision of the supervisor controller 408, is updated, as needed, based on the isolator data to be more accurately representative of the system 400.

The supervisor controller 408 is also coupled to the plurality of buffers 502 to receive the isolator data transmitted to the transceiver 404. The supervisor controller 408 compares the received isolator data to the global plant model 406 and, as was just mentioned, updates the global plant model 406 based on the comparisons. The supervisor controller 408 additionally generates isolator commands for one or more of the isolators 106, as needed, based on the comparisons, and supplies the isolator commands to the transceiver 404. In the depicted embodiment, the isolator commands are supplied to the transceiver 404 via a packetizer 504, which formats the commands for transmission to the isolators 106. The supervisor 402 may additionally include a non-illustrated clock, or other suitable circuit or device, which synchronizes the transmission and receipt of data to and from the supervisor 402, and from and to the isolators 106, respectively, and/or from and to the host device 410, respectively.

As was noted above, the isolators 106 transmit isolator data to the supervisor 402, and are responsive to isolator commands transmitted thereto from the supervisor 402. The format and content of the isolator data that each hybrid vibration isolator 106 transmits may vary. Preferably, however, the isolator data are representative of the states of the hybrid vibration isolators 106, such as the local commands and local feedback signals. The hybrid vibration isolators 106, and more particularly the controllers 214 in each of the hybrid vibration isolators 106, in response to the isolator commands transmitted to the hybrid vibration isolator 106 from the supervisor 402, are adapted to achieve optimal performance. More specifically, the control algorithm implemented in each controller 214 is updated. In addition, each controller 214, using its updated control algorithm, and based on the sensor signals supplied thereto from the associated sensor 212, generates and supplies local commands to the associated actuator 208. The actuator 208, in response to these local commands, damps structural vibrations in the mass 104.

Figure 6:
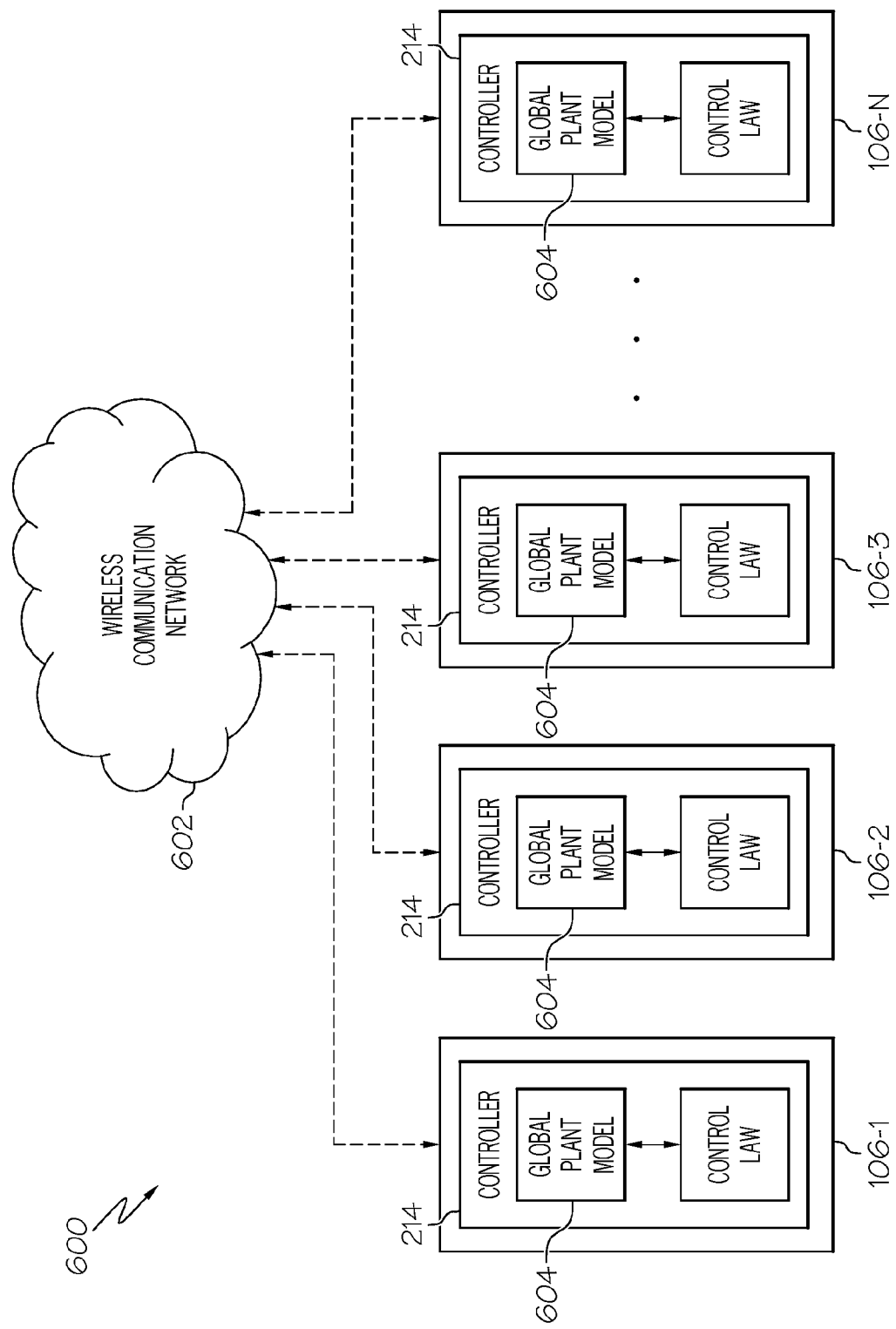
FIG. 6 depicts a functional block diagram of an alternative embodiment of a distributed network vibration isolation system.

It was previously mentioned that the transceivers 218 in each if the isolators 106 may, in an alternative embodiment, wirelessly receive data from, and wirelessly transmit data to, one or more other isolators 106. With reference now to FIG. 6, a functional block diagram of a distributed network vibration isolation system 600, in which each hybrid vibration isolator 106 is configured to wirelessly communicate with one or more other isolators 106, is depicted. When the isolators 106 are configured to wirelessly communicate with each other, the system 600 need not include, and preferably does not include, a centralized device such as the supervisor 402. Rather, in the embodiment depicted in FIG. 6, the vibration isolators 106 are each nodes in a wireless communication network 602, in which each hybrid vibration isolator 106 can wirelessly communicate with one or more other vibration isolators 106 within the network 602.

When implemented in the system 600 depicted in FIG. 6, each hybrid vibration isolator 106 is configured substantially identical to the description previously provided. However, as FIG. 6 further depicts, the controllers 214 in each of the vibration isolators 106 are additionally configured to include a global plant model 604. The global plant model 604 included in each of the controllers 214 is substantially similar to the global plant model 406 included in the supervisor 402, in that it is a model representative of the distributed network vibration isolation system 600; however, the global plant models 604 are each implemented as a reduced order models. It may be appreciated that because the actuators 208 and sensors 212 are collocated, a reduction in the order or each global plant model 604 will not significantly affect, if at all, model stability.

As FIG. 6 illustrates, each hybrid vibration isolator 106 transmits data to, and receives data from, one or more other vibration isolators 106 in the network 602. In some embodiments, each hybrid vibration isolator 106 may additionally re-transmit at least some of the data it receives from other vibration isolators 106. The data that each hybrid vibration isolator 106 transmits and receives includes isolator data. The format and content of the isolator data may vary, but are preferably data representative of the states of the hybrid vibration isolators 106, such as the local commands and local feedback signals. The isolator data also preferably includes data representative of the disturbance history of the system 600. No matter the specific format and/or content, the controller 214 in each hybrid vibration isolator 106, similar to the supervisor controller 408, compares the received isolator data to its global plant model 604 and, based on this comparison, updates its global plant model 604.

In addition, to updating its local plant model 604, each controller 214 also updates, as needed, the control algorithm. The controllers 214 also receive, for example, sensor signals from the associated sensors 212. In response to each of these data the controllers 214, via the control algorithm, additionally generates local commands. These local commands are, among other things, actuator commands that are supplied to the actuator 208 to damp vibrations in the mass 104. The controller 214 also supplies the above-described isolator data to the transceiver 218 for transmission to one or more other vibration isolators 106 in the network 602.

In some embodiments, network 602 may be configured as an ad-hoc communication network. If so, the vibration isolators 106 may also be configured to determine the optimum data transmission route through the network 602. It will be appreciated that the vibration isolators 106 may implement any one of numerous data transmission routing schemes to implement this functionality. For example, the vibration isolators 106 could implement ad-hoc on-demand distance vector routing (AODV), dynamic source routing (DSR), and global state routing (GSR), just to name a few.

Figure 7:
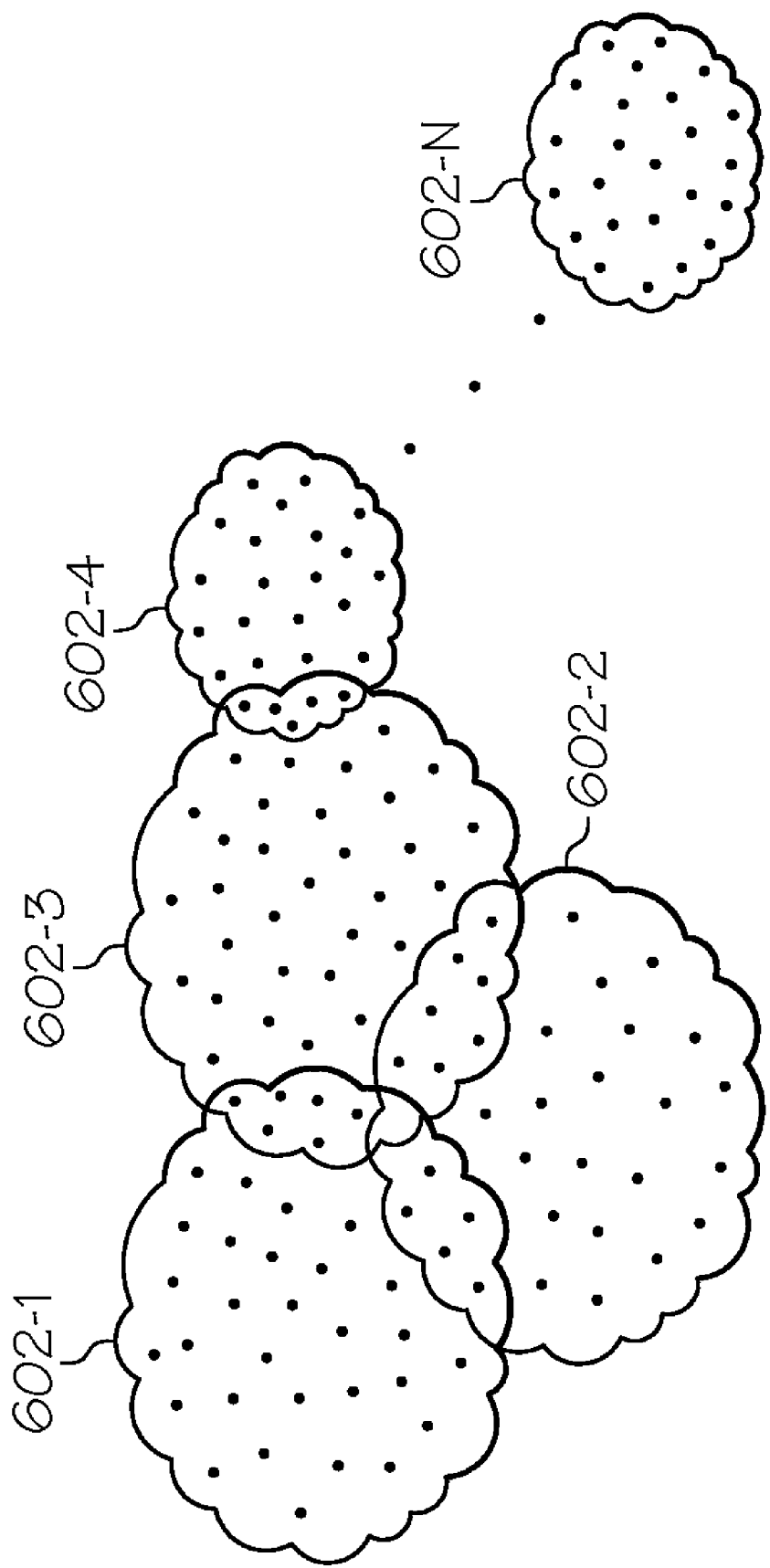
FIG. 7 depicts a functional block diagram of a plurality of intercommunicating distributed network vibration isolation systems.

The communication network 602 described above was, for clarity and ease of description, illustrated and described assuming that each hybrid vibration isolator 106 is a member of only a single network 602. However, as FIG. 7 depicts more clearly, it may be appreciated that one or more vibration isolators 106 in one communication network 602-1 could be members of one or more other communication networks 602-2, 602-3, 602-4, . . . 602-N. This multiplicity of network membership could occur simultaneously, or at only selected times during the life of a hybrid vibration isolator 106.

The distributed network vibration isolation systems described herein increase performance as compared to non-networked systems, while at the same time provide predictable, reliable, and wire-like system performance. The disclosed devices and systems reduce system complexity by eliminating large, single point masses typical of centralized electronics, eliminating large wiring harnesses, reducing structural modifications of the structure itself, and allowing for heterogeneous disturbance suppression technology. The systems and devices also provide increased performance relative to non-networked solutions.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A distributed vibration isolation system for damping vibrations in a mass, the system comprising:
a plurality of hybrid vibration isolators, each hybrid vibration isolator adapted to be coupled to the mass at a connection point, and at least partially responsive to local commands to damp vibrations in the mass, each vibration isolator in operable communication with at least one other of the plurality of vibration isolators, and each hybrid vibration isolator comprising:
an isolator controller configured to implement a control algorithm and including a global model representative of the distributed vibration isolation system, the isolator controller coupled to receive data representative of isolator data and operable, in response thereto, to update the control algorithm, the isolator controller further adapted to receive data representative of the structure at the connection point and, in response thereto, to generate the local commands, and
a wireless transceiver in operable communication with the isolator controller, the wireless transceiver configured to (i) at least selectively receive the isolator data transmitted thereto from the at least one other of the plurality of vibration isolators and supply the data representative of the isolator data to the isolator controller and (ii) at least selectively transmit isolator data to the at least one other of the plurality of vibration isolators, the isolator data representative of at least a state of the vibration isolator.

2. The system of claim 1, wherein each hybrid vibration isolator further comprises:
a housing;
a passive vibration isolator disposed within the housing and adapted to couple to, and passively damp structural vibrations in, the mass;
an active vibration isolator disposed within the housing and adapted to couple to, and actively damp structural vibrations in, the mass, the active vibration isolator system comprising:
an actuator coupled to receive the local commands from the isolator controller and operable, in response thereto, to move, and
a sensor configured to sense one or more parameters representative of structural vibrations in the mass and supply the data representative of the mass at the connection point to the isolator controller.

3. The system of claim 2, wherein:
the passive vibration isolator is configured to passively damp mid-frequency to high-frequency structural vibrations; and
the active vibration isolator is configured to actively damp low-frequency structural vibrations.

4. The system of claim 2, wherein the actuator comprises a piezoelectric actuator.

5. The system of claim 2, wherein the actuator comprises a voice coil actuator.

6. The system of claim 1, wherein the plurality of hybrid vibration isolators are in operable communication with at least one other of the plurality of hybrid vibration isolators via an ad hoc wireless communication network.

* * * * *